United States Patent [19]

Geisenberger

[11] Patent Number: 5,703,337
[45] Date of Patent: Dec. 30, 1997

[54] SYSTEM FOR CANCELLING SOUND WAVES

[75] Inventor: Stefan Geisenberger, Straubing, Germany

[73] Assignee: Nokia Technology GmbH, Pforzheim, Germany

[21] Appl. No.: 683,253

[22] Filed: Jul. 18, 1996

[30] Foreign Application Priority Data

Jul. 20, 1995 [DE] Germany .................. 195 26 456.8
Aug. 5, 1995 [DE] Germany .................. 195 28 888.2

[51] Int. Cl.⁶ ............................................. F01N 1/06
[52] U.S. Cl. ................................. 181/206; 381/71
[58] Field of Search ........................... 181/206, 171, 181/172; 381/71, 189, 199, 205

[56] References Cited

U.S. PATENT DOCUMENTS

| | | | |
|---|---|---|---|
| 5,233,137 | 8/1993 | Geddes | 181/206 |
| 5,255,321 | 10/1993 | Murray et al. | 381/71 |
| 5,272,286 | 12/1993 | Cain et al. | 181/206 |
| 5,466,899 | 11/1995 | Geisenberger | 181/206 |

FOREIGN PATENT DOCUMENTS 4317403   12/1994   Germany .
9502238   1/1995   WIPO .

*Primary Examiner*—Khanh Dang
*Attorney, Agent, or Firm*—Ware, Fressola, Van Der Sluys & Adolphson LLP

[57] ABSTRACT

An area between a gas exhaust pipe (23) and the front side (26) of a diaphragm (14) near the magnet system (11) is closed off by means of a corrugated cover (27). The presence of the cover (27) prevents acoustic short circuits between the front side (26) and a rear side (28) of the diaphragm (14). Since furthermore the end of the gas exhaust pipe (23, 23'), which protrudes into a space (25), does not reach the end of the diaphragm (14) which is connected with a bead (31), such a loudspeaker (10) can operate at very low continuous output.

7 Claims, 4 Drawing Sheets

SYSTEM FOR CANCELLING SOUND WAVES

TECHNICAL FIELD

The invention relates to the construction of systems for cancelling sound waves, particularly systems that are used to cancel sound in the gas exhaust devices of internal combustion engines.

BACKGROUND OF THE INVENTION

In the state of the art it is known to eliminate sound emissions by introducing into the sound waves of a sound emission source, sound waves which are 180° out-of-phase with respect to the sound waves of the sound emission source. These sound waves, which cancel the sound waves of the sound emission, are generally produced by electro-acoustical converters that receive a signal determined and prepared in the emission stream.

Systems that are based on the anti-sound principle and operate in conjunction with gas exhaust devices of internal combustion engines, create a series of problems. On the one hand, for a sufficiently good sound cancellation to take place, the converter must either have a high output, or it must be in a close spatial relationship with the area in which the sound waves of the sound wave emission source meet the sound waves produced by the converter. Since the sound waves in the gas exhaust streams of internal combustion engines, for example, are subject to temperature and contaminant loading, a close spatial relationship between exhaust gas and converter leads to problems of durability, because the converter/loudspeakers can only stand up to the given conditions for a short time. These problems can only be conditionally solved with the use of improved materials and manufacturing methods. Similar problems arise when the loudspeakers do not act directly on the gas exhaust stream, as shown in DE 43 43 324 U.S. Pat. No. 5,466,899 (FIG. 2), but rather, as shown in DE 43 17 403.5 (FIG. 1), the loudspeakers are located in a separate housing box, and the bass reflex tube of the box is joined to the gas exhaust pipe. Although the spatial separation of the loudspeakers from the gas exhaust stream decreases the effect which the exhaust gases have on the loudspeakers, the sound channel between the loudspeaker or the loudspeaker diaphragm and the connection area of the bass reflex tube and the gas exhaust pipe however, requires high continuous output from the loudspeaker, which in turn heats the loudspeaker, similar to the hot exhaust gases. A compromise arrangement is shown in U.S. Pat. No. 5,466,899 (FIG. 1), wherein the gas exhaust pipe ends in the box and the centerline of the loudspeaker forms a predetermined angle with the transition area of the gas exhaust pipe and the bass reflex tube/exhaust piece.

In addition to these configurations—designated as closed systems in connection with this application—open configurations are also known. The feature of these open configurations is that the sound cancellation takes place outside of the gas exhaust device, i.e. in the environment. For that purpose loudspeakers, or sound paths connected with loudspeakers, are provided at the end of the gas exhaust pipe, thus in the place where the exhaust gases are normally released into the environment, which are located for example adjacent to the end of the gas exhaust pipe, where they affect the outflowing exhaust gas column. The present invention is of the open system type, such as shown and described in WO 95 02238. According to this known arrangement, the magnet system of the otherwise conventionally built loudspeaker is equipped with a channel into which the end of the gas exhaust pipe penetrates and where the sound-affected exhaust gases exit from the gas exhaust pipe. Although this arrangement avoids the dipole effect of open systems, described on page 93 of the 1992 Technical Automobile Magazine, tests performed by the applicant have shown that such an arrangement on the one hand still requires high loudspeaker output, and on the other cannot be perceived as optimal with respect to the cancellation effect.

DISCLOSURE OF THE INVENTION

It is therefore an object of the invention to present an open system for sound cancellation that avoids the disadvantages of the state of the art.

This task is accomplished in that a cover is provided, which is gas impermeable and is connected to the diaphragm and to an end of a gas exhaust pipe emerging from a channel in a magnet system, the cover spanning a space near the magnet system, between the diaphragm and the emerging end of the gas exhaust pipe to form a gastight barrier.

This measure ensures that particles in the exhaust gas cannot penetrate into the air gap of the magnet system in the first place, and secondly that acoustic short circuits between sound waves radiated from the front and the back of the diaphragm are prevented.

A wavy contour of the cover may be used to ensure that travel movement associated with oscillations of the magnet system are not impaired. In addition, this form of the cover makes centering of the diaphragm superfluous, as otherwise required by the state of the art and by WO 95 02238 as well.

A particularly simple way of manufacturing the connection of cover and diaphragm is provided if the cover is made of an injection moldable elastomer and is connected to the diaphragm through injection molding. In that case, the method of manufacturing and connecting the diaphragm-bead combination known from DE 43 43 324 (from which U.S. Pat. No. 5,574,797 claims priority can be used to simultaneously manufacture a diaphragm/cover combination.

An improved centering effect crosswise to the travel movement of the magnet system is achieved, by building up the cover in multiple layers, particularly by using a reinforcing intermediate layer.

Moreover, if at least one opening is provided, which connects a space R1 formed by the cover, the emerging end of the gas exhaust pipe and the magnet system with a space R2, which is bounded by the surface of the diaphragm that faces away from the gas exhaust pipe, most of the attenuation effects caused by the air volume enclosed in space R1 are avoided.

The latter also occurs if the outside of the gas exhaust pipe is located at a radial distance A from an inner wall of the channel of the magnet system. Furthermore, since the air in the space between the channel wall and the gas exhaust pipe is pumped by the travel of the diaphragm, this measure achieves an additional cooling of the magnet system.

The loudspeaker output, and hence the input power requirements, can be further reduced if the front of the end of the pipe, i.e., there is made a space between the distal termination of the emerging end of the gas exhaust pipe and a plane defined by a largest end diameter of the cone-shaped diaphragm wherein the space has a length B measured lengthwise along the axis of the loudspeaker from the plane created by the largest end diameter of the cone-shaped diaphragm and the distal termination of the emerging end of the gas exhaust pipe. This can be attributed to the fact that most of the sound cancellation takes place in the diaphragm cone, because of the narrow or small size of the space between the surface of the diaphragm and the end of the gas exhaust pipe, thus the sound pressure that is emitted from the diaphragm does not experience any reduction along its course.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1A:
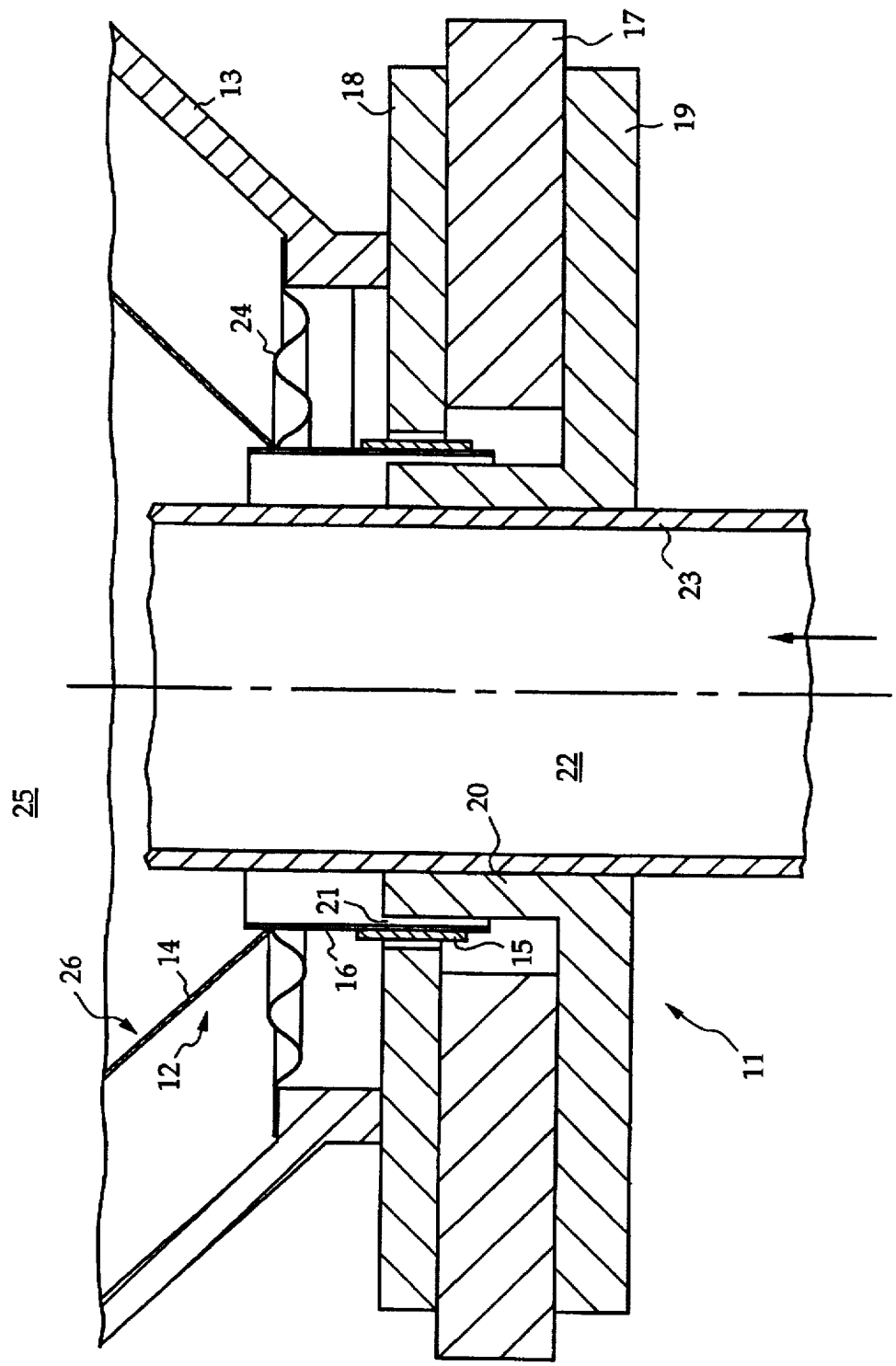
FIG. 1A illustrates a cross section of a prior art loudspeaker in the magnet system area.
Figure 1B:
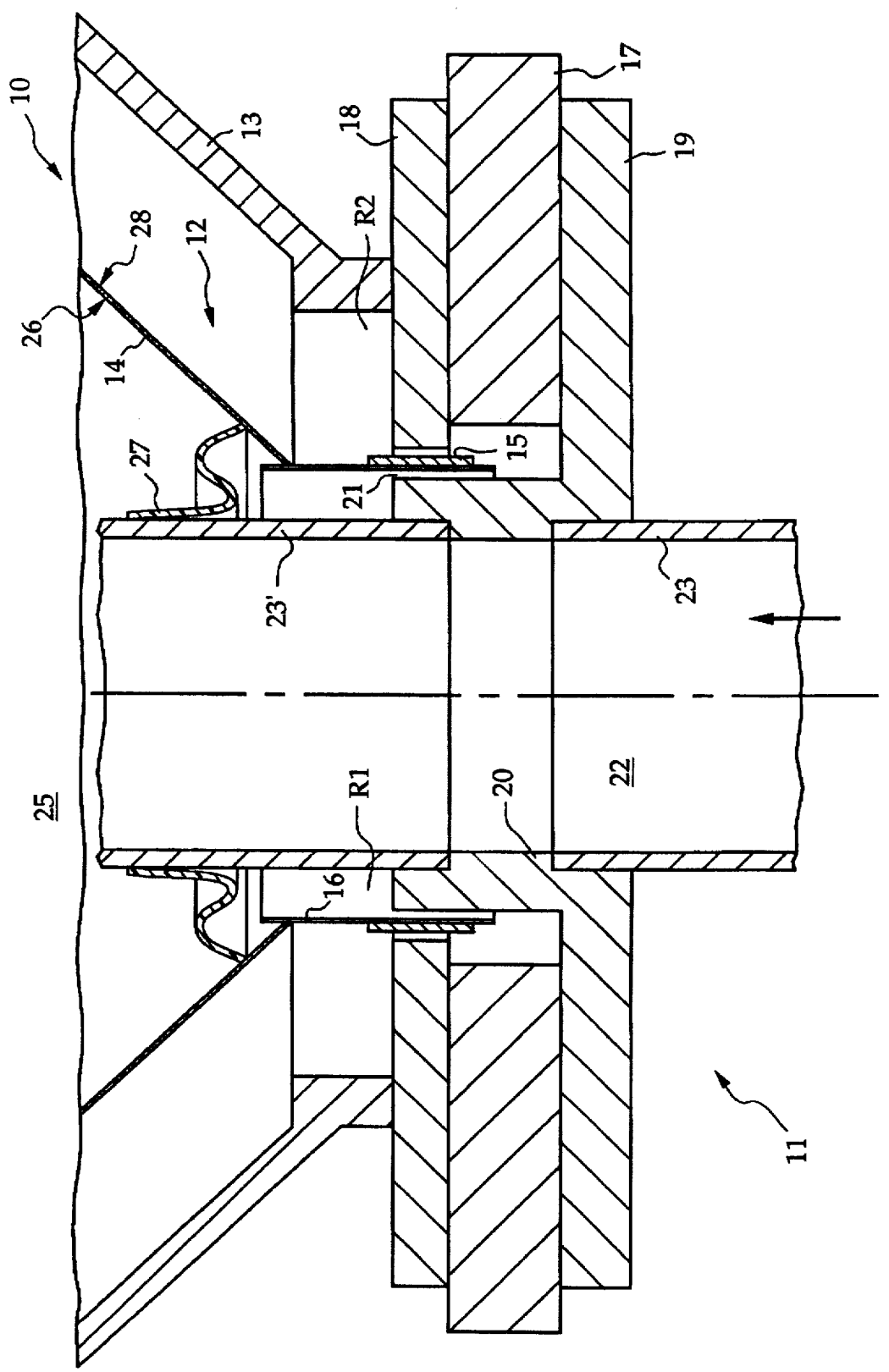
FIG. 1B is a cross section of a loudspeaker according to the invention, also in the magnet system area.

FIG. 1A is an illustration of a cross section of a loudspeaker according to the prior art in the magnet system area. FIG. 1B shows a cross section of a loudspeaker, according to the present invention, also in the magnet system area. The center line in both FIGS. 1A and 1B coincide with a longitudinal axis of symmetry, i.e., in a lengthwise or axial direction of the loudspeaker.

The loudspeaker 10 illustrated in FIG. 1A is essentially formed of a magnet system 11, an oscillating system 12 and a loudspeaker frame 13. The oscillating system 12 comprises a diaphragm 14 and an oscillator coil 15, which is connected by means of an oscillator coil support 16 to the diaphragm 14. The magnet system 11 is formed of a permanent magnet ring 17, an upper pole plate 18 and a pole body 20 connected to the lower pole plate 19, while the air gap 21 of the magnet system 11 is located between the pole body 20 and the upper pole plate 18. The diaphragm 14 is inserted into the loudspeaker frame 13, where the upper end of the diaphragm 14 is connected with the upper edge of the loudspeaker frame 13 (not illustrated in FIG. 1A). In this connected condition of diaphragm 14 and loudspeaker frame 13, the oscillator coil support 16 with the oscillator coil 15 deflect into the air gap 21 of magnet system 11. The construction of the pole body 20 of magnet system 11 is not massive, rather it is fully traversed by a channel 22 in the above-mentioned axial direction of loudspeaker 10. The gas exhaust pipe 23 passes through this channel 22, where it ends within a cone-shaped space 24 formed by the diaphragm 14 on the side of the pole core 20 that is connected to the diaphragm 14.

In accordance with the illustration in FIG. 1A, a centering diaphragm 24 connects the oscillator coil support 16 to the frame 13. By means of this centering diaphragm 24, the oscillator coil support 16 and thereby the oscillator coil 15 as well, are kept centered in the air gap 21 under any operating condition of loudspeaker 10. When exhaust gases flow through the gas exhaust pipe 23 in the direction of an arrow, as shown, the sound cancellation takes place in the space 25, in that the sound waves emitted by the front side 26 of diaphragm 14 meet the sound waves that exit from the end of the gas exhaust pipe 23 which passes through the channel 22.

The illustration in FIG. 1B differs from the illustration of FIG. 1A in that the front side 26 of diaphragm 14 is connected to a cover 27. This cover 27 is gas impermeable, has a wavy contour, leads to both the gas exhaust pipe 23' and the diaphragm 14, and is connected therewith in a way to form a gastight barrier. This cover 27 ensures that the sound waves emitted from the back side 28 of diaphragm 14 cannot reach the front side 26 of diaphragm 14. The prevention of acoustic short circuits brought about in this way cannot take place with a centering diaphragm 24 by itself, even of this centering diaphragm were built to be gastight, because the volume of air under the centering diaphragm 24 (illustration in FIG. 1A) would in any case be interchanged through the air gap 21 with the front side 26 of diaphragm 14.

In other words, if the centering diaphragm of the prior art were built as an airtight barrier, the lower surfaces of the centering diaphragm would generate soundwaves under swinging conditions of the voice coil. In that case, an airtight centering diaphragm 24 would be equivalent with the diaphragm 14, and the sound waves generated by the lower surface of the centering diaphragm can reach the upper surface 26 of the diaphragm 14 through the airgap 21, if no cover 27 is present. Furthermore, in the context, it should be pointed out that the air current in the airgap 21, which would be caused by the lower surface of the diaphragm 14 or of an airtight centering diaphragm, would entail an undesired current noise if no gasket 27 or damper were present.

In this light, the centering diaphragm 24 is not shown in the illustration of FIG. 1B. This means that such a centering diaphragm 24 is not absolutely necessary in the presence of a cover 27. The wavy contour of the cover 27 by itself ensures that the oscillator coil 15 is kept centered in the pole body 20 under any operating condition of loudspeaker 10.

In addition, in the illustration of FIG. 1B, the gas exhaust pipe 23 does not pass entirely through the channel 22. As can be seen in the illustration of FIG. 1A, the end of the gas exhaust pipe 23, which faces away from the sound source (not illustrated), does not fully pass through the channel, but only penetrates a few centimeters into the channel. The exhaust gases leave the channel 22 through another gas exhaust pipe 23', which is connected with the end of the channel 22 on the diaphragm side. This type of construction of loudspeaker 10 has the advantage that a loudspeaker which is only equipped with gas exhaust pipe 23' can be manufactured without great changes in production lines that are also used for loudspeakers equipped with a massive pole body 20.

Figure 4:
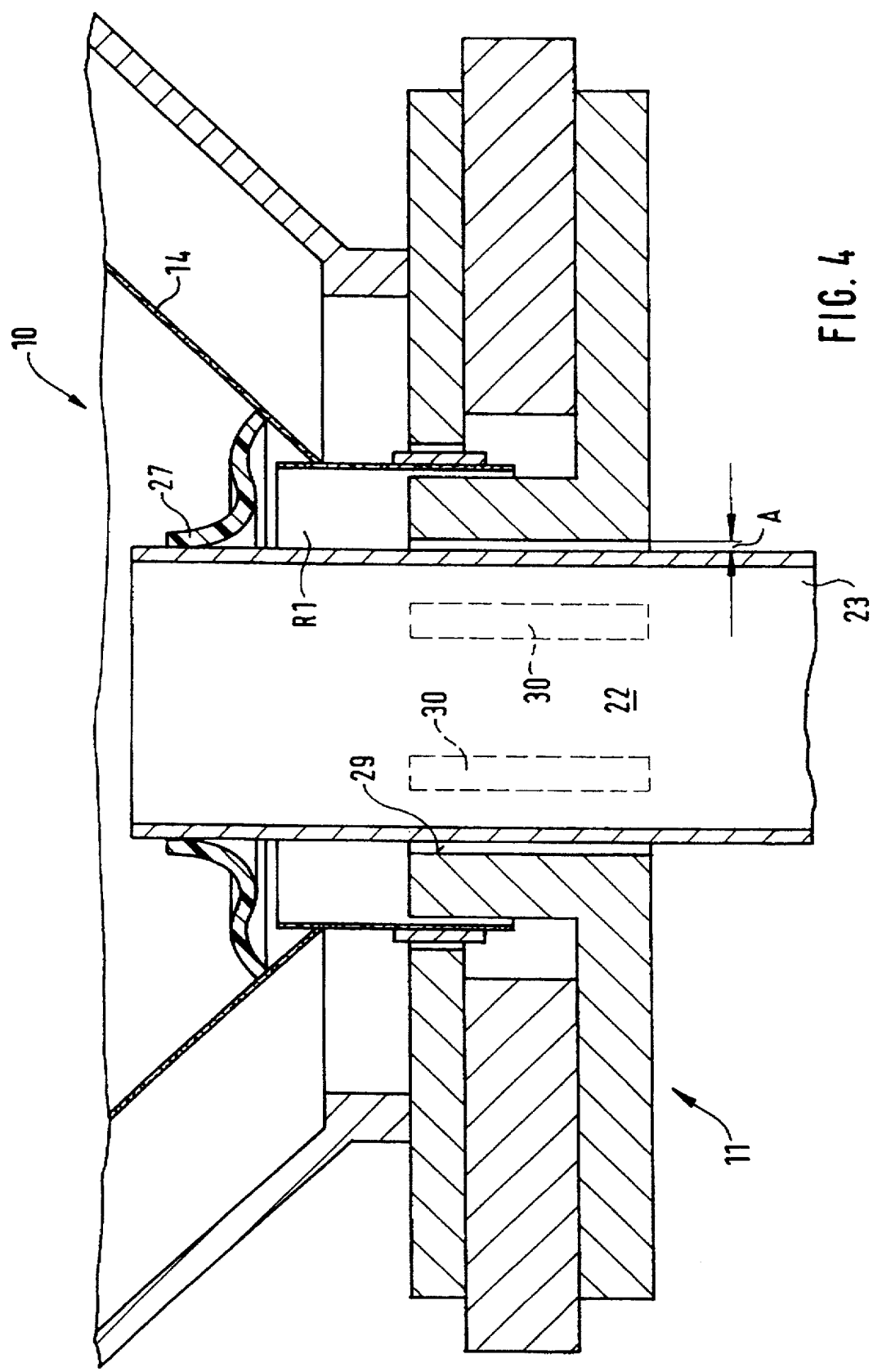
FIG. 4 is a cross section of another loudspeaker, according to the present invention, in the magnet system area.

FIG. 4 depicts a loudspeaker 10 in accordance with the illustration in FIG. 1B. Deviating from the illustration in FIG. 1B, the gas exhaust pipe 23 is located in channel 22 at a radial distance A from the wall. This creates an annular space of width A through which the air in space R1 is pumped by the excursion of diaphragm 14, which provides cooling of the magnet system 11. Appropriate protrusions 30 that fill the distance A in the form of spacers or standoffs are provided on the wall 29 of channel 22 for locating the gas exhaust pipe 23 in the channel 22 at a distance A.

Figure 2:
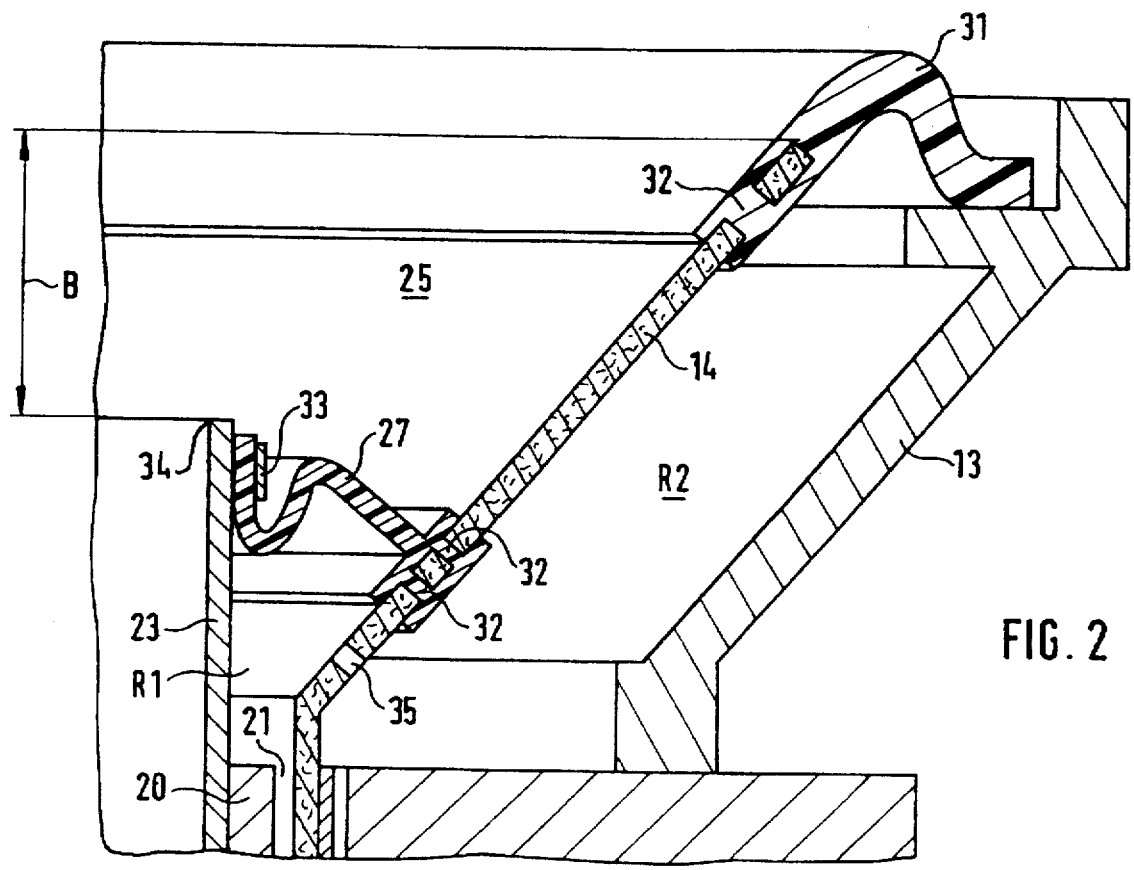
FIG. 2 is another cross section of a loudspeaker, according to the present invention.

Additional details of cover 27 can be found in FIG. 2. The configuration shown there has a cover 27, which is made of an injection moldable elastomer, in the same way as a bead 31 which connects the diaphragm 14 to the upper edge of the loudspeaker frame 13. For example, Silopren HV 2 from BASF is a material that is suited for this purpose. To establish a strong connection between the diaphragm 14 and suspension 27 or bead 31, the areas in which parts 27, 31 are connected to the diaphragm 14 are equipped with openings 32. The bead 31 and the cover 27 can easily be vulcanized to the diaphragm 14 if such a diaphragm 14 is placed into an injection mold (not illustrated). The connective strength of the vulcanized parts 27, 31 is ensured by allowing the materials of which the parts 27, 31 are made to penetrate into the openings 32 in diaphragm 14. The connection between the cover 27 and the gas exhaust pipe 23 (23') may be accomplished by means of a tension band 33, which presses the suspension 27 against the gas exhaust pipe 23 (23'). The connection between suspension 27 and diaphragm 14 or the gas exhaust pipe 23 (23') is not restricted to the mentioned methods of connection. Rather, in another not illustrated configuration example, the suspension 27 with the diaphragm 14 and/or with the gas exhaust pipe 23 (23') can be an ultrasonically welded connection, because in the arrangement depicted in FIG. 2, the attachment points between the suspension 27 and its connected parts 14, 23, (23') can freely be accessed with ultrasonic welding equipment.

The illustration in FIG. 2 also shows that the distal termination 34 of the gas exhaust pipe 23 is at a distance B with respect to the upper end of diaphragm 14. This distance B, which is not drawn to scale, ensures that the end 34 of gas exhaust pipe 23, which protrudes into the space 25, does not act as a so-called phasing cone.

The distance B can be selected according to a particular velocity of the current of the gas in the pipe 23. In other words, to reduce a loss of cancellation power generated by the diaphragm, the distance between the discharging gas column and the upper end of the diaphragm must be small. This means that the main cancellation work must be carried out inside the cone of the diaphragm. But if the velocity of the current of the gas is low, the low velocity of the current of the soundwaves generated by the diaphragm is not so critical as in the case where the velocity of the current of the gas is high. Therefore, in the case of low velocity of the current of the gas in the pipe, the distance B can be reduced. As a further result of a longer pipe end in the cone, the hot gas stream is more displaced from the temperature-sensitive components of the speaker. But if the free pipe end inside the cone is too long, the soundwaves of the diaphragm will be affected, even if the distance B is optimized in the aforementioned sense, because a longer free pipe end works as a so-called phasing cone. In this regard, it can be said that B should be maximized.

In order not to restrict the damping of the excursion movement of the oscillating system 12 through the airtight cover 27, FIG. 2 shows an opening 35, which permits an exchange of air between the enclosed space R1 and the space R2, which does not take place through the air gap 21.

Figure 3:
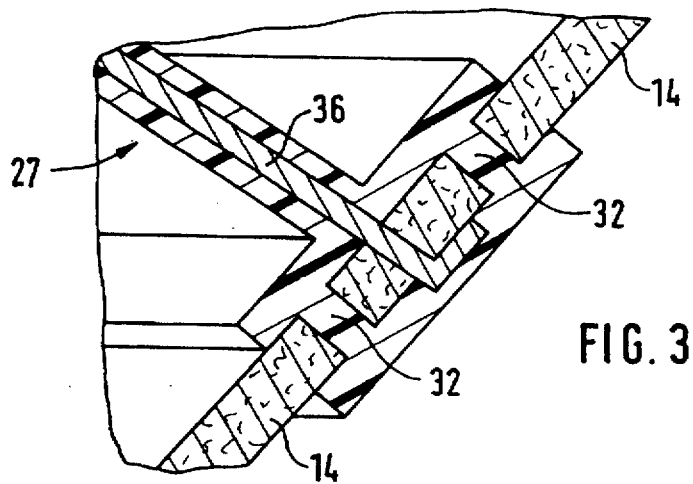
FIG. 3 is a cross section of the attachment area between the cover and the diaphragm of FIG. 2.

The centering diaphragm 24 can be omitted in the presence of a cover 27, if this cover 27 is equipped with a reinforcement insert 36, for example as shown in FIG. 3. In FIG. 3 this is realized so that the reinforcement insert 36 is enveloped by the cited elastomer material, of which the cover 27 is made according to the illustration in FIG. 2.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A system for cancelling sound waves in gas exhaust streams, comprising:
   a loudspeaker (10) that comprises a magnet system (11), an oscillating system (12) formed of a diaphragm (14) and an oscillator coil (15) for oscillating with respect to the magnet system, and to a frame (13) attached to the magnet system and the diaphragm, where the magnet system (11) includes a channel (22) along an axis of symmetry of the loudspeaker (10), and
   a gas exhaust pipe, having an end from where sound-affected exhaust gases exit from the gas exhaust pipe that pass through the channel (22), the pipe situated in the channel, at least in part, in such a way that it emerges into and terminates at an end thereof within a cone-shaped space (25) formed by the diaphragm (14), wherein a gas impermeable cover (27) is connected to the diaphragm (14) and to the end of the gas exhaust pipe to form a gastight barrier across a space between the diaphragm and the end of the gas exhaust pipe.

2. A system as claimed in claim 1, wherein the cover (27) is corrugated.

3. A system as claimed in claim 1, wherein the cover (27) is made of an injection moldable elastomer, and that at least the cover is connected to the diaphragm (14) by injection molding.

4. A system as claimed in claim 3, wherein the cover (27) comprises several layers.

5. A system as claimed in claim 1, wherein at least one opening is present in the diaphragm for connecting a first space (R1) formed by the cover (27), the end of the gas exhaust pipe and the magnet system (11), with a second space (R2), which is bounded by a surface (28) of the diaphragm (14) that faces away from the gas exhaust pipe for permitting an exchange of air between the first and the second space.

6. A system as claimed in claim 1, wherein an outside surface of the gas exhaust pipe is spaced at a radial distance A from an inner surface (29) of the channel (22) for forming an annular space of width A through which air is pumped by excursions of the diaphragm for cooling the system.

7. A system as claimed in claim 1, wherein the diaphragm (14) is cone-shaped and that a space exists between a distal termination of the end of the gas exhaust pipe and a plane formed by a largest diameter of the diaphragm cone.

* * * * *